(12) United States Patent
Handa

(10) Patent No.: US 6,217,995 B1
(45) Date of Patent: Apr. 17, 2001

(54) OPTICAL SHEET AND OPTICAL PART MADE OF TRANSPARENT RESIN, AND METHOD OF FABRICATING THEREOF

(75) Inventor: Keishin Handa, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/200,465

(22) Filed: Nov. 27, 1998

(30) Foreign Application Priority Data

Nov. 28, 1997 (JP) .................................................. 9-327712
Dec. 18, 1997 (JP) .................................................. 9-349168

(51) Int. Cl.$^7$ ............................................................ B32B 7/02
(52) U.S. Cl. ......................... 428/220; 428/68; 428/142; 428/156; 428/213; 264/1.6; 264/1.7; 264/1.24
(58) Field of Search ............................... 428/412, 64, 65, 428/220, 68, 137, 217, 142, 156, 213; 264/1.6, 1.7, 1.24

(56) References Cited

U.S. PATENT DOCUMENTS 4,982,014 * 1/1991 Freitag et al. ........................ 568/721
5,132,154 * 7/1992 Westeppe et al. .

FOREIGN PATENT DOCUMENTS 7-126375    5/1995  (JP) .

\* cited by examiner

Primary Examiner—Merrick Dixon
(74) Attorney, Agent, or Firm—Oblon, Spivak, McClelland, Maier & Neustadt, P.C.

(57) ABSTRACT

The essence of the present invention lies in an optical sheet made of transparent resin having a visible light transmittance of not less than 80%, a glass transition temperature of not lower than 150° C. and a thickness of from 0.2 to 1.5 mm, which exhibits a birefringence index of not higher than 15 nm, a surface roughness Ra of not more than 0.1 μm and an impact strength of not less than 600 gf·cm as calculated in terms of dropping ball breakdown energy determined by Du Pont process impact resistance test.

15 Claims, No Drawings

OPTICAL SHEET AND OPTICAL PART MADE OF TRANSPARENT RESIN, AND METHOD OF FABRICATING THEREOF

BACKGROUND OF THE INVENTION

1. Field of the Invention

The present invention relates to an optical sheet and an optical part made of transparent resin. More particularly, the present invention relates to an optical sheet and an optical part made of transparent resin obtained by subjecting a transparent resin to a specific heat treatment. The optical part of the present invention can be prepared by an efficient method. The product thus obtained has a light weight and excellent heat resistance, light resistance and impact resistance. The product is also advantageous in that if used in a planar form, it has a reduced thickness.

2. Description of the Related Art

An inorganic glass has heretofore predominated in the materials to be used in the preparation of products in the optical art. This is attributed to the fact that an inorganic glass inherently has an excellent light transmittance over a wide wavelength range, excellent heat resistance, chemical resistance, water resistance, surface hardness and abrasion resistance and a wide range of linear expansion coefficient.

However, the foregoing-inorganic glass is disadvantageous in that it requires a polishing step and much time to be finely worked on the surface thereof, if necessary. Thus, the foregoing inorganic glass cannot be fairly mass-produced and cannot be efficiently produced in a small amount for each of many varieties.

Further, the foregoing inorganic glass is required of low birefringence index if used for some glass parts. However, the foregoing inorganic glass cannot always attain birefringence as desired.

Moreover, an attempt has been made to apply resins such as polymethyl acrylate, polycarbonate, polyarylate and cyclic polyolefin to the art of optical parts taking advantage of its characteristics and transparency. An example of this attempt is to develop the application of such a resin to optical disc by reducing its optical distortion.

As such an example there has been noted the development of the application of these resins to the art of parts requiring a low birefringence index such as liquid crystal display board and liquid crystal projection optical parts. In these uses, these resins are required of birefringence index of not more than 15 nm, preferably not more than 10 nm, more preferably not more than 5 nm, most preferably not more than 2 nm, as calculated in terms of retardation value in single pass. These resins are required of good retention of shape at a temperature of 100° C. to meet requirements in various processings or practical use.

In an attempt to solve the foregoing problems, JP-A-60-222241 (The term "JP-A" as used herein means an "unexamined published Japanese patent application") proposes a process for solvent-casting a heat-resistant resin such as polyether sulfone. However, this process can difficultly allow the solvent to evaporate while maintaining desired surface precision on an industrial basis if the product has a thickness excess 100 μm. Thus, a sheet or molded product having a thickness of greater than 100 μm suitable as liquid crystal display board or optical member cannot be obtained from the standpoint of self-supporting properties and gas barrier properties.

Contrary that, in the case of using a thermoplastically forming method such as a extruded-molding or injection molding, the optical distortion of the sheet or molded product grow large at a stage immediately after forming, and it is impossible to obtain the sheet or molded having the desired quality from the standpoint of optical properties.

JP-A-7-126375 proposes a method which comprises heating an extruded sheet laminated with a protective film at a temperature of not lower than its glass transition temperature under an ordinary pressure as a method for eliminating the optical distortion of a thermoplastically formed flat board.

However, the foregoing heat treatment at a temperature of not lower than the glass transition temperature of the extruded sheet can difficultly maintain the flatness of the flat board which has been provided during forming at a good reproducibility because the frozen strain developed at forming disappears with a dynamic change. As a result, the optical distortion of the extruded flat board cannot be eliminated, making it impossible to obtain a substrate having the desired quality from the standpoint of optical properties or precision in surface flatness, as described later in the comparative examples.

SUMMARY OF THE INVENTION

An object of the present invention is to provide optical sheet or optical part having a good productivity and a necessary low birefringence index.

The inventors made extensive studies of the foregoing problems. As a result, it was found that optical sheet or optical part obtained by subjecting a specific material to a specific heat treatment has a low birefringence index and properties sufficient for optical part. Thus, the present invention has been worked out.

The essence of the present invention lies in an optical sheet made of transparent resin having a visible light transmittance of not less than 80%, a glass transition temperature of not lower than 150° C. and a thickness of from 0.2 to 1.5 mm, which exhibits a birefringence index of not higher than 15 nm, a surface roughness Ra of not more than 0.1 μm and an impact strength of not less than 600 gf·cm as calculated in terms of dropping ball breakdown energy determined by Du Pont process impact resistance test.

The essence of the present invention also lies in an optical part made of a transparent resin having a visible light transmittance of not less than 80% and a glass transition temperature of not lower than 80° C., which exhibits a birefringence index of not higher than 15 nm, a surface roughness Ra of not more than 0.1 μm.

The optical sheet and optical part according to the present invention can be used in any form and thus can be applied to optical communications parts such as light amplifier, light waveguide and optical fiber, non-linear optical elements, lens, dark room fluorescent materials, etc. The resin to be used as starting material in the present invention exhibits a good light transmittance in visible light range and thus can be used also as lens for visible light to advantage.

DESCRIPTION OF THE PREFERRED EMBODIMENTS

The present invention will be further described hereinafter.

(Optical Sheet)

The optical transparent resin sheet of the present invention is made of a transparent resin having a visible light transmittance of not less than 80% and a glass transition temperature of not lower than 150° C. The thickness of the sheet is defined to be from 0.2 to 1.5 mm from the standpoint of the nerve of the hot-pressed sheet or the reduction of the weight and thickness of the resin substrate of liquid crystal display. The sheet thus obtained exhibits a birefringence index of not more than 15 nm, a surface roughness Ra of not more than 0.1 μm and an impact strength of not less than 600 gf·cm as calculated in terms of breakdown energy determined by Du Pont process dropping ball impact resistance test.

If the transparent resin has too low a glass transition temperature, it cannot attain heat resistance required at the process for the preparation of liquid crystal display elements. The glass transition temperature of the transparent resin is preferably 160° C., more preferably 170° C. higher than required at the foregoing preparation process.

If the thickness of the foregoing sheet (hereinafter occasionally referred to as "resin substrate") is too small, the gap between the substrates cannot be kept constant, disadvantageously causing color stain, if used in a liquid crystal display form having an area exceeding that with a diagonal line having a length of 2 inch. Further, the resin substrate thus obtained lacks self-supporting properties if used in a liquid crystal display form having a large area. Moreover, the resin substrate thus obtained exhibits a low gas barrier properties, possibly causing the deterioration of the liquid crystal enclosed therein after a prolonged use and other troubles. From this standpoint of view, the thickness of the resin substrate is preferably not less than 0.3 mm, more preferably not less than 0.4 mm. On the contrary, if the thickness of the resin substrate exceeds 1.5 mm, its advantage of weight reduction over standard 0.7 mm thick glass substrate is disadvantageously lost. From this standpoint of view, the upper limit of the thickness of the resin substrate is preferably not more than 1.1 mm.

The birefringence of the sheet indicates the birefringence in the plane of the sheet formed by the film-making direction and the crosswise direction and is represented by optical phase difference in a single path. If this birefringence index exceeds 15 nm as calculated in terms of optical phase difference, the liquid crystal display element thus assembled is subject to color stain on the image or the like. In order to obtain a good image quality, the birefringence index of the sheet is preferably not more than 10 nm, more preferably not more than 5 nm.

If the surface roughness Ra of the sheet exceeds 0.1 μm, the liquid crystal display element thus assembled is similarly subject to color stain or other troubles deteriorating the image quality. In order to obtain a good image quality, the surface roughness Ra of the sheet is preferably not more than 0.05 μm, more preferably not more than 0.01 μm.

If the impact strength of the sheet falls below 600 gf·cm as calculated in terms of breakdown energy determined by Du Pont dropping ball impact test on specimen of 10 cm×10 cm×thickness not thinner than 0.2 mm, it is very likely that the sheet can crack when dropped, e.g., on a concrete floor. This is disadvantageous from the standpoint of handleability of the liquid crystal display element thus assembled, particularly resistance to cracking possibly occurring when mounted on the apparatus and yield of the product when sheets are formed or the liquid crystal display is mounted on the apparatus. The breakdown energy of the sheet is preferably not less than 900 gf·cm, more preferably not less than 2,000 gf·cm, even more preferably not less than 3,000 gf·cm, most preferably not less than 10,000 gf·cm.
(Optical Part)

The optical part of the present invention is made of a transparent resin having a visible light transmittance of not less than 80% and a glass transition temperature of not lower than 80° C. and exhibits a birefringence index of not more than 15 nm and a surface roughness Ra of not more than 0.1 μm.

The visible light transmittance of the foregoing resin, which is preferably not lower than 85%, can be obtained by subjecting a transparent resin having a glass transition temperature (Tg) of preferably not lower than 120° C. or its work to a specific heat treatment. If the light transmittance of the resin is too low, it is not appropriate from the standpoint of increase of darkness of display and increase of light amount loss, if the resin is used as optical part such as resin substrate for liquid crystal display element, microlens array and diffraction grating. Further, if the glass transition temperature of the resin is too low, the resin cannot attain heat resistance required at the process for the preparation of liquid crystal display elements. Also if used as an optical part, the resin cannot stand radiation heat from the light source.

The optical part of the present invention has the same value of visible light transmittance and Tg as the resin to be used as starting material.

The term "optical part" as used herein covers all of liquid crystal panel members such as light filter, polarizing plate, phase difference plate, viewing angle controlling plate and liquid crystal-oriented membrane and materials which transmit or reflect radiation such as isolator for optical communications, electrically-illuminated advertising plate, illumination cover and various window materials.

The thickness of the optical part is normally not less than 0.2 mm at maximum, preferably not less than 0.4 mm, more preferably not less than 1.0 mm. This is because if the optical part lacks self-supporting properties, it undergoes distortion and thus cannot perform as an optical part.

The birefringence index indicating the optical distortion of the optical part is meant to indicate the birefringence index in the plane formed on the resin by the film-making direction and the crosswise direction represented by optical phase difference. In general, if this birefringence index exceeds 15 nm as calculated in terms of optical phase difference, sufficient properties cannot be obtained if the resin is used as an optical part. Accordingly, the birefringence index of the optical part is preferably not more than 10 nm, more preferably not more than 5 nm.

The surface roughness Ra of the optical part is normally not more than 0.1 μm, preferably not more than 0.05 μm, more preferably not more than 0.01 μm, to obtain good properties.

The impact strength of the optical part is normally not less than 600 gf·cm, preferably not less than 900 gf·cm, more preferably not less than 2,000 gf·cm, most preferably not less than 3,000 gf·cm as calculated in terms of breakdown energy determined by Du Pont impact test on 1 mm thick specimen, from the standpoint of resistance to cracking possibly occurring during portable use.
(Resin as Starting Material)

As the resin to be used for optical sheet or optical part of the present invention there may be used one having a specific visible light transmittance and glass transition temperature as mentioned above. Examples of the transparent resin having such properties include non-crystalline resins such as polycarbonate, polyester carbonate, aromatic polyester, polysulfone, polyether sulfone and cyclic polyolefin, and resins which undergo hardening when acted upon by heat or light such as various epoxy resins, diacrylate resins and dimethacrylate resins.

Particularly preferred among these resins are thermoplastic resins from the standpoint of capability of securing desired impact strength without deteriorating birefringence and the surface smoothness.

Preferred among these various thermoplastic resins is polycarbonate resin or polyester carbonate resin, which is excellent in impact strength.

In particular, a polycarbonate resin or polyester carbonate resin having a carbonate connecting unit having a cyclic aliphatic group excellent in impact strength corresponding to melt flowability in an amount of not less than 5 mol-%, preferably not less than 15 mol-%, more preferably not less than 25 mol-%, based on the total weight of carbonate connecting units is preferably used to secure the desired impact strength without deteriorating the properties of the optical sheet or optical part, i.e., visible light transmittance, glass transition temperature, birefringence index, surface roughness.

Among these polycarbonate resins, those having a carbonate connecting unit the cyclic aliphatic group of which has been derived from 1,1-bis(4-hydroxyphenyl)cyclohexane (commonly known as bisphenol Z) may be preferably used. This is because the methylene bond connecting two benzene rings comprises a bulky functional group incorporated therein, restricting the move of molecular chain in this connecting portion to provide a high Tg value and disturbing orientation to lower the inherence birefringence index and photoelastic coefficient. Further, if the bulky functional group moiety is aromatic, a stack of benzene rings is produced to lower the inherent birefringence index without disturbing orientation, and as a result, crystalization caused by a reaction with solvent and occurrence of crack and craze are sometimes promoted, possibly inhibiting the reduction of total birefringence index. Therefore, polycarbonate resins containing a functional group derived from a cyclic aliphatic unit are preferably used.

The viscosity-average molecular weight of the transparent resin is preferably from 10,000 to 25,000. If the viscosity-average molecular weight of the transparent resin is too low, these resins have difficulty in impact resistance and heat resistance. On the other hand, if the viscosity-average molecular weight of the transparent resin is too high, the orientation can be difficultly relaxed, making it impossible to allow the birefringence index to reach the desired value. Taking into account these properties, the viscosity-average molecular weight of the polycarbonate resin or polyester carbonate resin is preferably from 11,000 to 22,000, more preferably from 12,000 to 18,000.

The foregoing polycarbonate resin can be obtained by a interfacial polymerization or melt polymerization process involving the reaction of a specific divalent phenol compound, phosgene and a carbonate precursor such as diester carbonate as essential components, and optionally an end terminator.

If necessary, a trivalent or higher bisphenol may be copolymerized in a proper amount. The polycarbonate resin thus obtained may have a straight-chain or branched main molecular chain.

Further, an aromatic dicarboxylic acid derivative or aromatic monocarboxylic acid derivative may be added as a starting material to produce an aromatic polyester carbonate resin.

Examples of the foregoing divalent phenol compound include bisphenols such as cyclohexane derivative (e.g., 1,1-bis (4-hydroxyphenyl)cyclohexane (commonly known as bisphenol Z), 1,1-bis (3-methyl-4-hydroxyphenyl)cyclohexane, 1,1-bis (3,5-dimethyl-4-hydroxyphenyl)cyclohexane, 1,1-bis(3-ethyl-4-hydroxyphenyl)cyclohexane, 1,1-bis(3-isobutyl-4-hydroxyphenyl)cyclohexane, 1,1-bis(3-fluoro-4-hydroxyphenyl)cyclohexane, 1,1-bis(3,5-difluoro-4-hydroxyphenyl)cyclohexane, 1,1-bis(3,5-dichloro-4-hydroxyphenyl)cyclohexane) and 3,3,5-trimethylcyclohexane derivative (e.g., 1,1-bis(4-hydroxyphenyl)-3,3,5-trimethylcyclohexane, 1,1-bis (3-methyl-4-hydroxyphenyl)-3,3,5-trimethylcyclohexane, 1,1-bis(3, 5-dimethyl-4-hydroxyphenyl)-3,3,5-trimethylcyclohexane, 1,1-bis(3-ethyl-4-hydroxyphenyl)-3,3,5-trimethylcyclohexane, 1,1-bis(3-isobutyl-4-hydroxyphenyl)-3,3,5-trimethylcyclohexane, 1,1-bis(3-fluoro-4-hydroxyphenyl)-3,3,5-trimethylcyclohexane, 1,1-bis(3,5-difluoro-4-hydroxyphenyl)-3,3,5-trimethylcyclohexane). These divalent phenol compounds may be used in admixture of two or more thereof.

As a component to be copolymerized with the foregoing divalent phenol compound there may be used one or more selected from the group consisting of bisphenols having hydrogen atom bonded to central carbon such as 2,2-bis (4-hydroxyphenyl)propane (commonly known as bisphenol A), bis(4-hydroxyphenyl)methane, 1,1-bis(4-hydroxyphenyl)ethane, 1,1-bis(4-hydroxyphenyl)-n-propane, 1,1-bis(4-hydroxyphenyl)-n-butane, 1,1-bis(4-hydroxyphenyl)-n-pentane, 1,1-bis(4-hydroxyphenyl)-n-hexane, 1,1-bis(4-hydroxyphenyl)-n-heptane, 1,1-bis(4-hydroxyphenyl)-n-octane, 1,1-bis(4-hydroxyphenyl)-n-nonane,1,1-bis(4-hydroxyphenyl)-n-decane, bis(4-hydroxyphenyl)phenylmethane, bis(4-hydroxyphenyl)naphthyl methane, bis(4-hydroxyphenyl)toluylmethane, bis(4-hydroxyphenyl)-(4-ethylphenyl)methane, bis(4-hydroxyphenyl)-(4-n-propylphenyl)methane, bis(4-hydroxyphenyl)-(4-isopropylphenyl)methane, bis(4-hydroxyphenyl)-(4-n-butylphenyl)methane, bis(4-hydroxyphenyl)-(4-pentylphenyl)methane, bis(4-hydroxyphenyl)-(4-hexylphenyl)methane, bis(4-hydroxyphenyl)-(4-fluorophenyl)methane, bis(4-hydroxyphenyl)-(4-chlorophenyl)methane, bis(4-hydroxyphenyl)-(2-fluorophenyl)methane, bis(4-hydroxyphenyl)-(2-chlorophenyl)methane, bis(4-hydroxyphenyl)tetrafluorophenylmethane, bis(4-hydroxyphenyl)tetrachlorophenylmethane, bis(3-methyl-4-hydroxyphenyl)methane, bis(3, 5-dimethyl-4-hydroxyphenyl)methane, bis(3-ethyl-4-hydroxyphenyl)methane, bis(3-isobutyl-4-hydroxyphenyl)methane, bis(3-t-butyl-4-hydroxyphenyl)-1-phenylmethane, bis(3-phenyl-4-hydroxyphenyl)-1-phenylmethane, bis(3-fluoro-4-hydroxyphenyl)methane, bis(3,5-difluoro-4-hydroxyphenyl)methane, bis(3-chloro-4-hydroxyphenyl)methane, bis(3,5-dichloro-4-hydroxyphenyl)methane, 1,1-bis(3-methyl-4-hydroxyphenyl)ethane, 1,1-bis(3,5-dimethyl-4-hydroxyphenyl)ethane, 1,1-bis(3-ethyl-4-hydroxyphenyl)ethane, 1,1-bis(3-isobutyl-4-hydroxyphenyl)ethane, 1,1-bis(3-fluoro-4-hydroxyphenyl)ethane, 1,1-bis(3,5-difluoro-4-hydroxyphenyl)ethane, 1,1-bis(3-chloro-4-hydroxyphenyl)ethane and 1,1-bis(3,5-dichloro-4-hydroxyphenyl)ethane, bisphenols having one methyl group bonded to central carbon atom such as 2,2-bis(4-hydroxyphenyl)-n-pentane, 2,2-bis(4-hydroxyphenyl)-n-hexane, 2,2-bis(4-hydroxyphenyl)-n-heptane, 2,2-bis(4-hydroxyphenyl)-n-octane, 2,2-bis(4-hydroxyphenyl)-n-nonane, 2,2-bis(4-hydroxyphenyl)-n-decane, 1,1-bis(4-hydroxyphenyl)-1-phenylethane (commonly known as bisphenol P), 1,1-bis(4-hydroxyphenyl)-1-naphthylethane, 1,1-bis(4-hydroxyphenyl)-1-toluylethane, 1,1-bis(4-hydroxyphenyl)-1-(4-ethylphenyl)ethane, 1,1-bis(4-hydroxyphenyl)-1-(4-n- propylphenyl)ethane, 1,1-bis(4-hydroxyphenyl)-1-(4-isopropylphenyl)ethane, 1,1-bis(4-hydroxyphenyl)-1-(4-n-butylphenyl)ethane, 1,1-bis(4-hydroxyphenyl)-1-(4-pentylphenyl)ethane, 1,1-bis(4-hydroxyphenyl)-1-(4-hexylphenyl)ethane, 1,1-bis(3-t-butyl-4-hydroxyphenyl)-1-phenylethane, 1,1-bis(3-phenyl-4-hydroxyphenyl)-1-phenylethane, 1,1-bis(4-hydroxyphenyl)-1-(4-fluorophenyl)ethane, 1,1-bis(4-hydroxyphenyl)-1-(4-chlorophenyl)ethane, 1,1-bis(4-hydroxyphenyl)-1-(2-chlorophenyl)ethane, 1,1-bis(4-hydroxyphenyl)-1-tetrafluorophenylethane and 1,1-bis(4-hydroxyphenyl)-1-tetrachlorophenylethane, bisphenols having two methyl groups bonded to central carbon atom such as 2,2-bis(3-methyl-4-hydroxyphenyl)propane (commonly known as bisphenol C), 2,2-bis(3,5-dimethyl-4-hydroxyphenyl)propane, 2,2-bis(3-ethyl-4-hydroxyphenyl)propane, 2,2-bis(3-isobutyl-4-hydroxyphenyl)propane, 2,2-bis(3-fluoro-4-hydroxyphenyl)propane, 2,2-bis(3,5-difluoro-4-hydroxyphenyl)propane, 2,2-bis(3-chloro-4-hydroxyphenyl)propane and 2,2-bis(3,5-dichloro-4-hydroxyphenyl)propane, bisphenols such as diphenylmethane derivative (e.g., bis(4-hydroxyphenyl)-1,1-diphenylmethane, bis(3-methyl-4-hydroxyphenyl)-1,1-diphenylmethane, bis(3-t-butyl-4-hydroxyphenyl)-1,1-diphenylmethane, bis(3-phenyl-4-hydroxyphenyl)-1,1-diphenylmethane, bis(3-chloro-4-hydroxyphenyl)-1,1-diphenylmethane), bisphenols such as cyclohexane derivative (e.g., 1,1-bis(4-hydroxyphenyl)cyclohexane (commonly known as bisphenol Z), 1,1-bis(3-methyl-4-hydroxyphenyl)cyclohexane, 1,1-bis(3,5-dimethyl-4-hydroxyphenyl)cyclohexane, 1,1-bis(3-ethyl-4-hydroxyphenyl)cyclohexane, 1,1-bis(3-isobutyl-4-hydroxyphenyl)cyclohexane, 1,1-bis(3-fluoro-4-hydroxyphenyl)cyclohexane, 1,1-bis(3,5-difluoro-4-hydroxyphenyl)cyclohexane, 1,1-bis(3-chloro-4-hydroxyphenyl)cyclohexane, 1,1-bis(3,5-dichloro-4-hydroxyphenyl)cyclohexane), bisphenols such as 3,3,5-trimethylcyclohexane derivative (e.g., 1,1-bis(3-methyl-4-hydroxyphenyl)-3,3,5-trimethylcyclohexane, 1,1-bis(3,5-dimethyl-4-hydroxyphenyl)-3,3,5-trimethylcyclohexane, 1,1-bis(3-ethyl-4-hydroxyphenyl)-3,3,5-trimethylcyclohexane, 1,1-bis(3-isobutyl-4-hydroxyphenyl)-3,3,5-trimethyl cyclohexane, 1,1-bis(3-fluoro-4-hydroxyphenyl)-3,3,5-trimethylcyclohexane, 1,1-bis(3,5-difluoro-4-hydroxyphenyl)-3,3,5-trimethylcyclohexane), bisphenols such as fluorene derivative (e.g., 9,9-bis(4-hydroxyphenyl)fluorene, 9,9-bis(3-methyl-4-hydroxyphenyl)fluorene, 9,9-bis(3,5-dimethyl-4-hydroxyphenyl)fluorene, 9,9-bis(3-ethyl-4-hydroxyphenyl)fluorene, 9,9-bis(3-isobutyl-4-hydroxyphenyl)fluorene, 9,9-bis(3-fluoro-4-hydroxyphenyl)fluorene, 9,9-bis(3,5-difluoro-4-hydroxyphenyl)fluorene), bisphenols such as cycloalkane derivative (e.g., 1,1-bis(4-hydroxyphenyl)cyclopentane, 1,1-bis(4-hydroxyphenyl)cycloheptane, 1,1-bis(4-hydroxyphenyl)cyclooctane, 1,1-bis(4-hydroxyphenyl)cyclononane, 1,1-bis(4-hydroxyphenyl)cyclodecane), bisphenols having an aromatic ring directly bonded thereto such as 4,4'-biphenol, bisphenols such as sulfone derivative (e.g., bis(4-hydroxyphenyl)sulfone, bis(3-methyl-4-hydroxyphenyl)sulfone, bis(3,5-dimethyl-4-hydroxyphenyl)sulfone, bis(3-ethyl-4-hydroxyphenyl)sulfone, bis(3-isobutyl-4-hydroxyphenyl)sulfone, bis(3-fluoro-4-hydroxyphenyl)sulfone, bis(3,5-difluoro-4-hydroxyphenyl)sulfone), bisphenols having an ether bond such as bis(4-hydroxyphenyl)ether, bis(3-methyl-4-hydroxyphenyl)ether, bis(3,5-dimethyl-4-hydroxyphenyl)ether, bis(3-ethyl-4-hydroxyphenyl)ether, bis(3-isobutyl-4-hydroxyphenyl)ether, bis(3-fluoro-4-hydroxyphenyl)ether and bis(3,5-difluoro-4-hydroxyphenyl)ether, bisphenols having a sulfide bond such as bis(4-hydroxyphenyl)sulfide, bis(3-methyl-4-hydroxyphenyl)sulfide, bis(3,5-dimethyl-4-hydroxyphenyl)sulfide, bis(3-ethyl-4-hydroxyphenyl)sulfide, bis(3-isobutyl-4-hydroxyphenyl)sulfide, bis(3-fluoro-4-hydroxyphenyl)sulfide and bis(3,5-difluoro-4-hydroxyphenyl)sulfide, bisphenols such as sulfoxide derivative (e.g., bis(4-hydroxyphenyl)sulfoxide, bis(3-methyl-4-hydroxyphenyl)sulfoxide, bis(3,5-dimethyl-4-hydroxyphenyl)sulfoxide, bis(3-ethyl-4-hydroxyphenyl)sulfoxide, bis(3-isobutyl-4-hydroxyphenyl)sulfoxide, bis(3-fluoro-4-hydroxyphenyl)sulfoxide, bis(3,5-difluoro-4-hydroxyphenyl)sulfoxide), bisphenols having a hetero atom-containing aliphatic group such as phenolphthalein, dihydroxybenzenes such as hydroquinone, resorcinol and methyl hydroquinone, dihydroxynapthalenes such as 1,5-dihydroxynapthalene and 2,6-dihydroxynaphthalene, and bisphenols free of carbon-hydrogen bond such as bis(2,3,5,6-tetrafluoro-4-hydroxyphenyl)difluoromethane, 1,1-bis(2,3,5,6-tetrafluoro-4-hydroxyphenyl)perfluoroethane and 2,2-bis(2,3,5,6-tetrafluoro-4-hydroxyphenyl)perfluoropropane. The amount of the copolymerizable component to be used is predetermined such that the glass transition temperature (not lower than 130° C.) of the resulting polycarbonate resin cannot be impaired.

As a trivalent phenol to be optionally copolymerized there may be used a compound such as tris (4-hydroxyphenyl) methane, 1,1,1-tris(4-hydroxyphenyl)ethane, α, α', α"-tris (4-hydroxyphenyl)-1,3,5-triisopropylbenzene and 1,3,5-tris (4'-hydroxyphenyl)benzene.

In the present invention, as the polycarbonate resin there may be used a resin blend obtained by melting or dissolving a polycarbonate resin obtained from the foregoing divalent phenol compound and a polycarbonate resin obtained from the foregoing bisphenol compound listed above as copolymerizable component.

As the phosgene there is preferably used one having a purity as high as possible. The phosgene to be used herein is preferably free of impurities such as carbon tetrachloride and methylene chloride.

Examples of the diester carbonate employable herein include bisalkyl carbonates such as dimethyl carbonate, methyl ethyl carbonate, diethyl carbonate, diisopropyl carbonate and di-n-butyl carbonate, bisaryl carbonates such as diphenyl carbonate, ditoluyl carbonate and di-4-chlorophenyl carbonate, activated carbonic acid derivatives such as phosgene, bromophosgene, bis(2,4,6-trichlorophenyl)carbonate, bis(2,4-dichlorophenyl) carbonate, bis(2-cyanophenyl)carbonate and carbodiimidazole, phosgene oligomers such as triphosgene and trichloromethyl chloroformate, aromatic polycarbonate oligomers terminated by chloroformate group, and aromatic polyester carbonate oligomers terminated by chloroformate group. The diester carbonate employable herein is not specifically limited so far as it is reactive with bisphenols. In practice, however, a carbonic acid derivative having a high activity eliminatable group such as phosgene is particularly preferred for interfacial polymerization or pyridine process of the resin, and a bisaryl carbonate such as diphenyl carbonate is particularly preferred for melt polymerization of the resin.

In the process for the preparation of the polycarbonate resin of the present invention, as an arbitrary component there may be used as a copolymerizable component an aromatic dicarboxylic acid derivative or a monocarboxylic acid containing hydroxyl group such as lactic acid and malic acid besides the divalent phenols, phosgene or diester carbonates. In this manner, an aromatic polyester carbonate can be prepared. Further, an end terminator may be added to the reactive components to control the molecular weight of the resulting resin.

The term "aromatic dicarboxylic acid derivative to be used as component copolymerizable with aromatic polyester carbonate resin" as used herein is meant to indicate an aromatic dicarboxylic acid or a compound obtained by converting one or both of the two carboxyl groups of the aromatic dicarboxylic acid to any one of ester, acid halide and acid anhydride. The aromatic dicarboxylic acid derivative has condensation reactivity with the monomer represented by the general formula (A) as a copolymerizable component of the resin or a phenolic hydroxyl group contained in bisphenols. Examples of the aromatic dicarboxylic acid include benzene derivatives such as terephthalic acid, isophthalic acid and phthalic acid, and naphthalene derivatives such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalene dicarboxylic acid, 1,7-naphthalenedicarboxylic acid, 1,8-naphthalenedicarboxylic acid, 2,3-naphthalenedicarboxylic acid, 2,4-naphthalenedicarboxylic acid, 2,5-naphthalenedicarboxylic acid, 2,6-naphthalenedicarboxylic acid and 2,7-naphthalenedicarboxylic acid. Particularly preferred among these aromatic dicarboxylic acid derivatives are aromatic dicarboxylic acids such as benzene derivative (e.g., terephthalic acid, isophthalic acid), naphthalene derivative (e.g., 2,6-naphthalenedicarboxylic acid), and dimethyl ester or diacidic chloride thereof.

Examples of the aromatic monocarboxylic acid derivative having one phenolic hydroxyl group which may be used also as a copolymerizable component of aromatic polyester carbonate resin include aromatic monocarboxylic acids having one phenolic hydroxyl group such as benzoic acid derivative (e.g., p-hydroxybenzoic acid, m-hydroxybenzoic acid, o-hydroxybenzoic acid (salicylic acid)) and naphthalenecarboxylic acid derivative (e.g., 5-hydroxy-1-naphthalenedicarboxylic acid, 5-hydroxy-2-naphthalene dicarboxylic acid, 6-hydroxy-1-naphthalenedicarboxylic acid, 6-hydroxy-2-naphthalenedicarboxylic acid), aromatic monocarboxylic acid esters having one phenolic hydroxyl group such as methyl ester of the aromatic monocarboxylic acid, and compounds obtained by acetylating the hydroxyl group contained in the aromatic monocarboxylic acid. Among these compounds, p-hydroxybenzoic acid and methyl ester thereof or p-hydroxybenzoic acid derivative such as acetylated p-hydroxybenzoic acid are most preferably used for the reason of polymerization reactivity.

As the end terminator there may be used a compound having one phenolic hydroxyl group. Examples of such an end terminator include monovalent phenols having alkyl group, aryl group, halogen atom, etc. such as phenol, o-cresol, m-cresol, p-cresol, 2,3-dimethylphenol, 2,4-dimethylphenol, 2,5-dimethylphenol, 2,6-dimethylphenol, 3,4-dimethylphenol, 3,5-dimethylphenol, 4-ethylphenol, 4-isopropylphenol, 4-n-propylphenol, 4-t-butyl phenol, 4-isobutylphenol, 4-n-butylphenol, 4-t-octylphenol, nonylphenol, 4-phenylphenol, tribromophenol, 4-dodecylphenol and 4-stearylphenol.

In the preparation of the aromatic polyester carbonate resin, end terminators known in the process for the preparation of the resin such as aromatic monocarboxylic acids or ester or acid halide thereof may be used besides the foregoing compounds having one phenolic hydroxyl group. Representative examples of these aromatic monocarboxylic acids include benzoic acid derivatives having alkyl group, aryl group, halogen atom, etc. such as benzoic acid, 2-methylbenzoic acid, 3-methylbenzoic acid, 4-methylbenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, 4-esterbenzoic acid, 4-isopropylbenzoic acid, 4-n-propylbenzoic acid, 4-t-butylbenzoic acid, 4-isobutylbenzoic acid, 4-n-butylbenzoic acid, 4-t-octylbenzoic acid, nonylbenzoic acid, 4-phenylbenzoic acid, tribromobenzoic acid, 4-dodecylbenzoic acid and 4-stearylbenzoic acid.

The preparation of the polycarbonate resin can be accomplished by any of known processes such as (1) an interfacial polymerization process involving the polycondensation reaction of an alkaline metal salt of bisphenol and a carbonic acid ester derivative active to nucleophilic attack as starting materials on the interface of an organic solvent capable of dissolving the resulting polymer with an aqueous alkali, (2) a pyridine process involving the polycondensation reaction of a bisphenol and a carbonic acid ester derivative active to nucleophilic attack as starting materials in an organic base such as pyridine and (3) a melt polymerization process involving the melt polycondensation of a bisphenol and a carbonic acid ester such as bisalkyl carbonate and bisaryl carbonate. Further, the ratio of the amount of phosgene, alkali, amine catalyst, etc. to bisphenol, the concentration of reaction solution, the reaction temperature, the reaction time, etc. may be arbitrarily predetermined depending on the purpose. The optical sheet of the present invention preferably comprises (1) a polycarbonate resin having a carbonate bond containing a cyclic aliphatic group and (2) a polycarbonate resin having a general-purpose bisphenol A unit incorporated therein in admixture at a weight ratio of from 2:8 to 8:2. (Process for the preparation of optical sheet and optical part)

The optical sheet or optical part of the present invention can be obtained by hot-pressing the foregoing transparent resin or its work at the following temperature T:

$$\overline{Mv}/600 + Tg + 140 \geq T \geq \overline{Mv}/600 + Tg - 20 \quad (1)$$

wherein T represents a heat treatment temperature (°C.); Tg represents the glass transition temperature (°C.) of said resin; and $\overline{Mv}$ represents the viscosity-average molecular weight of said resin.

If T (°C.) represented by the foregoing relationship is too low, the resulting effect of reducing birefringence index is not sufficient, occasionally making it impossible to obtain a resin substrate having the desired low retardation value. On the contrary, if T (°C.) represented by the foregoing relationship is too high, the resulting industrial cycle time is prolonged, occasionally causing troubles such as deterioration of resin.

The lower limit of the hot pressing temperature T (°C.) falls within the range preferably represented by the relationship:

$$T \geq \overline{Mv}/600 + Tg - 10,$$

more preferably $$T \geq \overline{Mv}/600 + Tg,$$

even more preferably $$T \geq \overline{Mv}/600+Tg+5$$

The upper limit of the hot pressing temperature T (°C.) falls within the range preferably represented by the relationship:

$$T \leq \overline{Mv}/600+Tg+100,$$

more preferably $$T \leq \overline{Mv}/600+Tg+70,$$

even more preferably $$T \leq \overline{Mv}/600+Tg+50$$

In the present invention, the heating time and cooling time are not specifically limited. In practice, however, they can be shortened as much as possible so far as the temperature uniformity cannot be impaired in the heating and cooling cycles of the apparatus to advantage on an industrial basis.

In general, heating time at hot pressing temperature T (°C.) is usually from several seconds to one hour, preferably from several seconds to half an hour, more preferably from one minute to twenty minutes.

A heating rate up to the hot pressing temperature T is usually, 5–70° C./min., preferably 20–50° C./min. In the case the rate is too late, cycle time becomes long and industrial problems are occurred. Further since the product is exposed on a high temperature condition for a long time, heat deterioration problem is sometimes occurred. On the other hand, in the case the rate is too fast, uniform heating tends to be prevented.

A cooling rate from the hot pressing temperature T is usually, 5–50° C./min., preferably 10–40° C./min. In the case the rate is too late, cycle time becomes long and industrial problems are occurred. Further since the product is exposed on a high temperature condition for a long time, heat deterioration problem is sometimes occurred. On the other hand, in the case the rate is too fast, uniform cooling tends to be prevented. And strain caused by cooling is locally remained and it is in danger to affect a shape accuracy and birefringence index.

Further when heating or cooling step is performed, it is very important that temperature of each part (component) is controlled accurately. In the case that a difference of the temperature within an effective range of heating stage (pressured heating plate) of the hot press is more than 10° C., size accuracy of molded product is impaired and it is in danger that the product is warped or birefringence index is not be able to be reduced sufficiently.

According to the above described, accurate hot pressing which circulate a heat medium and controls to heat and cool an entire heating stage accurately and rapidly, is preferably used as an appropriate hot pressing.

The formation of the optical resin part to be subjected to hot pressing can be accomplished by any known extrusion or injection molding method involving the extrusion of a molten resin from a slit die such as T-die or casting of a resin solution. Alternatively, an optical resin part prepared by casting a resin solution may be used.

Preferred among these methods for molding the optical resin part is injection molding method, which involves the use of a resin having a high flowability and requires no solvent, taking into account the molecular weight suitable for forming, the intensity of molecular orientation during forming, the removability of residual solvent and the transferability from the mold used and relaxation of orientation during hot pressing.

The portion constituting the upper and lower members of the hot press between which said transparent resin or its work is sandwiched during hot pressing has a surface roughness Ra of not more than 0.1 μm. If the surface roughness Ra exceeds this value, the liquid crystal display element thus assembled is subject to troubles such as color stain that deteriorates the image quality. Further, the resin substrate, if used as an optical part, is subject to irregular reflection or scattering of light on the surface thereof that deteriorates the image quality. In order to obtain good image quality and optical properties, the surface roughness Ra is more preferably not more than 0.05 μm, even more preferably not more than 0.01 μm.

An average of the pressure P under which hot pressing is effected for one minute of the final stage at the temperature represented by the foregoing relationship is preferably from 0 to 1,000 (g/cm²). If the pressure P is too small, the resulting precision in transfer from the flat surface leaves something to be desired. On the contrary, if the pressure P is too great, the resulting relaxation of orientation is sometimes insufficient even if the pressing temperature is raised, making it impossible to allow the birefringence index to decrease to the desired value. In this respect, hot pressing is preferably effected at a pressure falling within the range represented by the following relationship:

$$10 \leq P \leq 500,$$

more preferably $$20 \leq P \leq 200,$$

even more preferably $$40 \leq P \leq 100$$

The ambient atmosphere of the transparent resin or its work during hot pressing is an inert gas such as nitrogen and argon or vacuum. Particularly preferred among these ambient atmospheres is vacuum.

Hot pressing may be effected in ordinary atmosphere without any problem to obtain the desired substrate. However, the surface of the upper and lower members (resin substrate and transferring medium) of the hot press between which the resin work is sandwiched can be oxidized due to high temperature and oxygen in the atmosphere, occasionally making it difficult to peel off the resin substrate. The occurrence of this phenomenon becomes remarkable particularly when the flat surface is re-used many times. Accordingly, if hot pressing is effected in an atmosphere of inert gas, the oxygen gas concentration is not more than 10% by volume, preferably not more than 5% by volume, more preferably not more than 1% by volume, most preferably not more than 0.1% by volume.

On the other hand, if hot pressing is effected in vacuum, even when some gap happens to occur between the resin substrate and the flat surface, it can never form air bubble that would remain. Thus, hot pressing in vacuum is preferred.

Accordingly, if hot pressing is effected in vacuum, the pressure in the system is not greater than 100 mmHg, preferably not greater than 50 mmHg, more preferably not greater than 20 mmHg.

As the hot press there may be recommended a high temperature tank type vacuum hydraulic press equipped with a precisely surface-finished hot plate and a control system allowing accurate operation of heating/cooling, pressure controlling and vacuum controlling program taking into account the foregoing conditions.

The temperature D (°C.) at which the transparent or work thereof which has been hot-pressed is peeled off the members of the hot press between which it has been sandwiched preferably falls within the range represented by the following relationship:

$$Tg>D \geq Tg-120$$

If this temperature is too high, the product can be deformed during peeling. On the contrary, if this temperature is too low, the difference in linear expansion coefficient between the resin and the surface of the members causes the resin to crack.

If this temperature falls within the range represented by the foregoing relationship, the resin can be fairly peeled off the members. Further, taking into account the improvement in productivity such as quality and yield, the peeling temperature D (°C.) preferably falls within the range represented by the following relationship:

$$Tg-20>D \geq Tg-100,$$

more preferably $$Tg-40>D \geq Tg-90,$$

even more preferably $$Tg-40>D \geq Tg-60$$

These steps may be batchwise effected or continuously effected on, e.g., stainless belt or turn table.

The optical transparent resin sheet or part according to the present invention can be used as various display elements for the purpose of display, particularly liquid crystal display elements, or various optical members particularly for the purpose of display, such as optical parts for liquid crystal projection and optical sheets and parts for use in polarization system such as a resin substrate for liquid crystal display.

DESCRIPTION OF THE PREFERRED EMBODIMENT

The present invention will be further described in the following examples, but the present invention should not be construed as being limited thereto.

The various physical properties were measured as follows:
(1) Light transmittance (LT)
Light transmittance was measured in accordance with JIS K7105.
(2) Glass transition temperature
Glass transition temperature was measured in accordance with ASTM D3418.
(3) Thickness of resin work
The thickness of the resin sheet was measured by means of a thickness gauge. (unit: mm)
(4) Birefringence index
For the measurement of birefringence index, a Type ADR-150 N automatic birefringence index meter (produced by ORC MANUFACTURING CO., LTD.) was used. In some detail, the specimen was measured for single pass retardation value (R value; unit: nm) when light was perpendicularly incident thereon.
(5) Surface roughness
For the measurement of surface roughness, a Type Surfcom 575A surface roughness meter (produced by TOKYO SEIMITSU CO., LTD.) was used. The specimen was measured for surface roughness (Ra; unit: $\mu$) with a diamond probe (R: 1 $\mu$m; 90 degree cone) over a length of 0.5 mm at a cut-off value of 0.16 mm and a rate of 0.06 mm/sec. with linear correction.
(6) Impact strength test
For the measurement of impact strength, Du Pont falling ball impact test method was employed. As the measuring instrument there was used a falling ball impact tester produced by Toyo Seiki Seisakusho, Ltd. The lowest breakdown energy was represented by the lowest falling ball energy at which the sample to be tested can rupture or crack.
(7) Kind of base resin
Resins having the structural formulae set forth in Table 2 were used.
(8) Viscosity-average molecular weight
For the viscosity-average molecular weight of polycarbonate, a 6 g/l methylene chloride solution of polycarbonate was measured for solution viscosity at 25° C. which was then subjected to conversion by Schnnel's viscosity equation.
(9) Breakage test
A A-5 size resin substrate which had been hot-pressed was allowed to drop onto a concrete floor from a height of 50 cm. The specimen was then visually observed for breakage.
(10) Preparation of chemical-resistant coating agent
40 parts by weight of dimethirole tricychrodecan diacrylate (produced by Kyoeisha Chemical Co., Ltd.: light acrylate DCP-A), 25 parts by weight epoxy acrylate (KAYARAD R130, produced by NIPPON KAYAKU CO., LTD.), 35 parts by weight of dimethrole propan tetraacrylate (produced by Kyoeisha Chemical Co., Ltd.: light acrylate DTMP-4A), and 5 parts by weight of 2-hydroxy-2-methyl-1-phenyl-propane-1-one (Irgacure 1800, produced by Ciba Special Chemicals Co., Ltd.) were uniformly stirred in a stream of nitrogen, and then defoamed to obtain a composition. The composition thus obtained was then uniformly coated on the desired substrate by a spin coater.

EXAMPLE 1

A polycarbonate P (having a structural formula set forth in Table 2) with a viscosity-average molecular weight of 14,000, LT of from 85 to 90% and Tg of 180° C. was subjected to injection molding in an injection compression mold through a M-200B type 200 ton injection machine (produced by Meiki Co., Ltd.) to obtain a A5 size flat plate having a thickness of 0.8 mm. Subsequently, prior to moistening, this obtained flat plate was subjected to hot pressing between stainless steel plates of hot press having a surface roughness Ra of 0.004 $\mu$m and pre-heated up to 100° C. And then the pressing temperature was increased up to 270° C. for 10 minutes and after then remained at 270° C. The pressing time was 20 minutes. The pressure at which hot pressing is effected at a temperature of 270° C. was 60 g/cm$^2$ at last 5 minutes.

After then the pressing temperature is decreased up to 120° C. for 20 minutes. The plate thus hot-pressed was then peeled off one of the stainless steel plates by inserting a screw driver into the gap therebetween when the temperature of the stainless steel plate reached 120° C. The resin substrate was then peeled off the other stainless steel plate by slowly rolling up it with a spatula-like tool. At this point, the A5 size substrate thus peeled was then subjected to impact strength test. As a result, the substrate showed a lowest breakdown energy of not less than 10,000 gf·cm.

Subsequently, the substrate was degreased with ethanol. The chemical-resistant coating agent above (10) described was applied to both surface of the substrate to a dry thickness of 3 μm by means of a spin coater, air-dried at room temperature for 30 minutes, and then irradiated with ultraviolet rays from a 4 kw output high-voltage mercury vapor lamp at a dosage of 60 J/cm² to undergo hardening. As the exposing unit there was used "Toscure 40", produced by Toshiba Lighting & Technology Corp.

Gas barrier layers are formed on the both surfaces of the transparent substrate thus obtained, and then $SiO_x$ films are vacuum-evaporated to a thickness of 300 Å on the surfaces of the substrate as an undercoat layer. ITO film was then formed onto the undercoat layer to a thickness of 1,000 Å as a transparent electrically-conductive layer on a front side surface of the substrate by sputtering method. At this point, the coated substrate was measured for surface roughness Ra. As a result, the substrate was found to have Ra of 0.004 μm. Then the ITO film was patterned by photolithgrapy to form an ITO transparent electrically-conductive layer pattern. A polyimide were then spin-coated onto the ITO transparent electrically-conductive layer to a thickness of about 500 Å to form an oriented layer thereon. On the other hand, the chemical-resistant coating agent above (10) described is spin-coated on the $SiO_x$ film of a rear side surface of the substrate and cured to form a top coat layer. A liquid crystal material was then injected into the gap between two substrates obtained as above. The liquid crystal material was then sealed with a sealing member. The laminate was further laminated with a polarizing plate on the outer side thereof to obtain a liquid crystal display element. No problems occurred at the preparation process. The liquid crystal display element thus obtained exhibited an image quality similar to that of a liquid crystal display element comprising a glass substrate. The results are set forth in Table 3.

EXAMPLE 2

The preparation procedure of Example 1 was followed except that a 1/1 mixture (obtained by melt mixing in a biaxial extruder: Tg of the mixture is 170° C.) of a polycarbonate A (having a structural formula set forth in Table 2) with a viscosity-average molecular weight of 16,000, ans LT of from 85 to 90% and the polycarbonate P was used as a starting material and the hot pressing temperature was 250° C. The product thus obtained was then evaluated in the same manner as in Example 1.

EXAMPLE 3

The preparation procedure of Example 1 was followed except that a 1/1 mixture (obtained by melt mixing in a biaxial extruder; LT: 85 to 90%; Tg: 175° C.) of a polycarbonate Z(n=55) having a structural formula set forth in Table 2 with a viscosity-average molecular weight of 23,000 and a polycarbonate A with a viscosity-average molecular weight of 15,000 was used as a starting material. The product thus obtained was then evaluated in the same manner as in Example 1.

Comparative Example 1

The preparation procedure of Example 1 was followed except that a polycarbonate A with a viscosity-average molecular weight of 16,000, LT of from 85 to 90% and Tg of 145° C. was used as a starting material and the thickness of the resulting injection-compressed plate was 1 mm. The product thus obtained was then evaluated in the same manner as in Example 1. However, the resin substrate exhibited worsened surface roughness due to lack of heat resistance at the step of ITO coating. Thus, the LCD substrate thus assembled showed color stain.

Comparative Example 2

As a starting material there was used a polycarbonate P with a viscosity-average molecular weight of 20,000, LT of from 85 to 90% and Tg of 181° C. The resin was dissolved in methylene chloride, solvent-casted over a steel plate, and then freed of the solvent by drying to obtain a film having a thickness of 0.1 mm. The liquid crystal display element thus assembled showed color stain because the film lacks self-supporting properties.

Comparative Example 3

The preparation procedure of Example 1 was followed except that as a starting material there was used a polycarbonate P with a viscosity-average molecular weight of 17,000, LT of from 85 to 90% and Tg of 180° C. and a stainless steel plate having a surface roughness Ra of 0.2 μm was used during hot pressing. The product thus obtained was then evaluated in the same manner as in Example 1. The STN liquid crystal display element having a diagonal line of 5 inch, thus assembled from the resin substrate showed color stain because the resin substrate lacks surface roughness.

Comparative Example 4

The preparation procedure of Example 1 was followed except that as a starting material there was used a cyclic polyolefin resin having a structural formula set forth in Table 2 with Tg of 170° C. The resin substrate thus prepared was then subjected to impact strength test. As a result, the resin substrate showed a lowest breakdown energy of 480 gf·cm.

Comparative Example 5

A cavity was formed by an optical polished glass plate and a silicon plate having a width of 5 mm and a thickness of 0.8 mm as a spacer. The surrounding of the cavity was then sealed with a tape to form an injection mold.

99 parts by weight of p-bis(β-methacryloyloxy ethylthio) xylene and 1 part by weight of pentaerythritol tetrakis(β-thiopropionate) as photo-setting resins and 0.06 parts by weight of 2,4,6-trimethylbenzoyl diphenyl phosphine oxide ("Luciline TPO", produced by BASF) and 0.04 parts by weight of benzophenone as photosetting initiators were uniformly stirred, and then defoamed to obtain a composition. The composition was injected into the injection mold, and then irradiated with ultraviolet rays from a 80 W/cm output metal halide lamp disposed above and below the glass plate at a distance of 40 mm for 30 minutes to undergo hardening. The injection mold was then removed from the composition to obtain a resin substrate made of a photo-setting resin. The resin substrate thus obtained was then subjected to impact strength test. As a result, the resin substrate showed a lowest breakdown energy of 550 gf·cm.

Comparative Example 6

The preparation procedure of Example 1 was followed except that a polycarbonate P with a viscosity-average molecular weight of 35,000, LT of from 85 to 90% and Tg of 184° C. was used as a starting material and the thickness of the resulting injection-compressed plate was 0.8 mm. The product thus obtained was then evaluated in the same manner as in Example 1. The resin substrate thus obtained exhibited a great molecular weight and didn't show sufficient relaxation of orientation during hot pressing to have a great birefringence index. The STN liquid crystal display element having a diagonal line of 5 inch thus assembled showed color stain on both surfaces.

Comparative Example 7

A resin substrate was prepared in the same manner as in Example 1 except that as a starting material there was used a polycarbonate P with a viscosity-average molecular weight of 8,000, LT of from 85 to 90% and Tg of 170° C. and the thickness of the resulting injection-compressed plate was 0.8 mm.

However, the resin substrate cracked when peeled off the stainless steel plate due to the lack of molecular weight. Further, the resin substrate was subjected to impact strength test. As a result, the resin substrate showed a lowest breakdown energy of 580 gf·cm.

TABLE 1

| Example No. | Base resin | Substrate formation method | % Light transmittance | Tg (° C.) | Viscosity-average molecular weight | Thickness (mm) | Birefringence index (nm) | Surface precision Ra (µm) | Impact strength (gf · cm) |
|---|---|---|---|---|---|---|---|---|---|
| Comparative Example | | | | | | | | | |
| 1 | PC* A | i** + h.p.*** | 85–90 | 145 | 16,000 | 1 | 0–5 | 0.008 | >10,000 |
| 2 | PC P | Solvent casting | 85–90 | 181 | 20,000 | 0.1 | 0–5 | 0.005 | >10,000 |
| 3 | PC P | i + h.p. | 85–90 | 180 | 17,000 | 1 | 0–5 | 0.2 | >10,000 |
| 4 | CP**** | i + h.p. | 85–90 | 170 | | 1 | 0–5 | 0.006 | 480 |
| 5 | Photo-setting resin | | 85–90 | 160 | | 0.6 | 0–5 | 0.004 | 550 |
| 6 | PC P | i + h.p. | 85–90 | 184 | 35,000 | 0.6 | 5–17 | 0.008 | >10,000 |
| 7 | PC P | i + h.p. | 85–90 | 174 | 8,000 | 0.6 | 0–5 | 0.01 | >10,000 |
| Example | | | | | | | | | |
| 1 | PC P | i + h.p. | 85–90 | 180 | 14,000 | 0.6 | 0–5 | 0.004 | >10,000 |
| 2 | PC AP | i + h.p. | 85–90 | 170 | 16,000 | 0.6 | 0–5 | 0.005 | >10,000 |
| 3 | PC ZA | i + h.p. | 85–90 | 175 | 18,000 | 0.6 | 0–5 | 0.008 | >10,000 |

| Example No. | Ball falling test (A5 size specimen falling onto concrete floor from 50 cm height) | Surface precision after coated with ITO Ra (µm) | Visual conditions of A5 size liquid crystal display element |
|---|---|---|---|
| Comparative Example | | | |
| 1 | No breakage | 0.04 | Color stain |
| 2 | No breakage | 0.007 | Color stain |
| 3 | No breakage | 0.2 | Color stain |
| 4 | Breakage at end | 0.006 | |
| 5 | Breakage at end | 0.004 | |
| 6 | No breakage | 0.008 | Color stain |
| 7 | Breakage at end | 0.01 | |
| Example | | | |
| 1 | No breakage | 0.004 | No trouble |
| 2 | No breakage | 0.006 | No trouble |
| 3 | No breakage | 0.008 | No trouble |

*PC: polycarbonate;
**i: injection;
***h.p.: hot pressing;
****CP: cyclic polyolefin

TABLE 2

| Resin | Structural formula (repeating unit) |
|---|---|
| Polycarbonate A (MCC 7020 AD2) | $\left(\!\!-\!\!\overset{\displaystyle O}{\underset{\|}{C}}\!\!-\!\!O\!\!-\!\!\bigcirc\!\!-\!\!\bigcirc\!\!-\!\!O\!\!-\!\!\right)_n$ |

TABLE 2-continued

| Resin | Structural formula (repeating unit) |
|---|---|
| Polycarbonate P (MCC (trial)) | 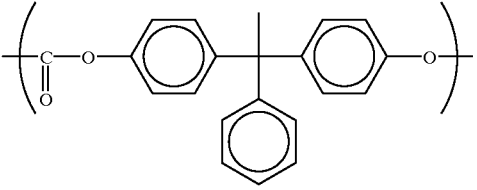 |
| Polycarbonate Z' (product A of other company) | 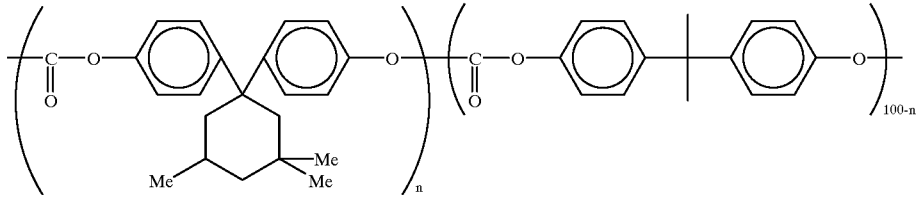 |
| Cyclic polyolefin (product B of other company) | 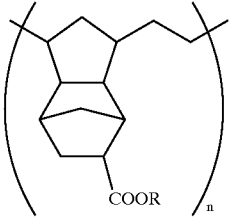 |

EXAMPLE 4

A polycarbonate P (having a structural formula set forth in Table 2) with a viscosity-average molecular weight of 14,000, LT of from 85 to 90% and Tg of 180° C. was subjected to injection molding in an injection compression mold through a M-200B type 200 ton injection machine (produced by Meiki Co., Ltd.) to obtain a 5×5 cm size plate having a thickness of 0.8 mm.

Subsequently, prior to moistening, above obtained plate was subjected to hot pressing between stainless steel plates having a surface roughness Ra of 0.004 μm and pre-heated up to 100° C. And then the pressing temperature was increased up to 260° C. for 15 minutes and after then remained at 260° C. The pressing time was 20 minutes. The pressure at which hot pressing is effected at a temperature of 260° C. was 50 g/cm² for last 5 minutes of a final stage. The hot pressing was effected in an oven. The atmospheric pressure in the oven was 750 mmHg, and the oxygen concentration in the oven was 1% by volume. The resin substrate thus hot-pressed was allowed to cool to a temperature of 130° C. in 20 minutes while being sandwiched between the stainless steel plates. When the entire temperature of the resin substrate reached 130° C., one of the stainless steel plates was peeled off the resin substrate with a screw driver. As a result, the resin substrate remained stuck to the other stainless steel plate. The other stainless steel plate could be easily peeled off the resin substrate by slowly rolling up it at the end thereof.

The resin substrate thus peeled was then kept in a 145° C. oven for 2 hours so that it was annealed to thoroughly relax the residual stress. Thus, a desired resin substrate was obtained.

The resin substrate thus obtained exhibited a birefringence index of from 0 to 5 nm all over the surface thereof as calculated in terms of single pass retardation value and a surface roughness Ra of 0.004 μm. The resin substrate also exhibited an impact strength of not less than 10,000 gf·cm as determined by Du Pont impact strength test. The transparent resin substrate showed no particular visual problems on external appearance.

The conditions under which the resin substrates used in the foregoing examples and comparative examples were subjected to heat treatment and the results of evaluation of the resin substrates thus treated are set forth in Table 3.

EXAMPLE 5

A A5 size plate was prepared in the same manner as in Example 4 except that as a starting material there was used a 1/1 mixture (obtained by melt mixing in a biaxial extruder; viscosity-average molecular weight: 14,000; LT: 85–90%; Tg: 170° C.) of a polycarbonate A (having a structural formula set forth in Table 2) with a viscosity-average molecular weight of 16,000 and a polycarbonate P with a viscosity-average molecular weight of 12,000. And the plate is applied to the hot press pre-heated up to 120° C. The pressing temperature was increased up to 250° C. for 6 minutes and after then remained at 250° C. for 15 minutes. The atmospheric pressure in the oven at which hot pressing is effected was 30 g/cm². The pressure at which hot pressing was effected at a temperature of 250° C. was 30 g/cm² for last 5 minutes of a final stage. After then the hot press is cooled from 250° C. to 130° C. for 5 minutes and the resin substrate thus hot-pressed was peeled and annealed in the same manner as in Example 4 to obtain a desired resin substrate.

The resin substrate thus obtained exhibited a birefringence index of from 0 to 5 nm all over the surface thereof as calculated in terms of single pass retardation value and a surface roughness Ra of 0.005 μm. The resin substrate also exhibited an impact strength of not less than 10,000 gf·cm as determined by Du Pont impact strength test. The transparent resin substrate showed no particular visual problems on external appearance.

EXAMPLE 6

A A5 size plate was prepared in the same manner as in Example 4 except that as a starting material there was used a 1/1 mixture (obtained by melt mixing in a biaxial extruder; viscosity-average molecular weight: 18,000; LT: 85–90%; Tg: 175° C.) of a polycarbonate Z' having a structural formula set forth in Table 2 with a viscosity-average molecular weight of 23,000 and a polycarbonate A with a viscosity-average molecular weight of 15,000. And the plate is applied to the hot press pre-heated up to 140° C. The pressing temperature was increased up to 250° C. for 30 minutes and after then remained at 250° C. for 8 minutes. The atmospheric pressure in the oven at which hot pressing is effected was 30 g/cm². The pressure at which hot pressing was effected at a temperature of 260° C. was 40 g/cm². After then the hot press is cooled from 250° C. to 140° C. for 4 minutes. The resin substrate thus hot-pressed was peeled at a temperature of 140° C. and annealed at a temperature of 150° C. in the same manner as in Example 4 to obtain a desired resin substrate.

The resin substrate thus obtained exhibited a birefringence index of from 0 to 5 nm all over the surface thereof as calculated in terms of single pass retardation value and a surface roughness Ra of 0.008 μm. The resin substrate also exhibited an impact strength of not less than 10,000 gf·cm as determined by Du Pont impact strength test. The transparent resin substrate showed no particular visual problems on external appearance.

EXAMPLE 7

A 1/1 mixture (obtained by melt mixing in a biaxial extruder; viscosity-average molecular weight: 18,000; LT: 85–90%; Tg: 175° C.) of a polycarbonate Z' with a viscosity-average molecular weight of 23,000 and a polycarbonate A with a viscosity-average molecular weight of 15,000 was subjected to injection molding in an injection compression mold through a M-200B type 200 ton injection machine (produced by Meiki Co., Ltd.) to obtain a 5×5 cm size plate having a thickness of 3 mm.

Subsequently, prior to moistening, this plate was subjected to hot press between metal plates having a surface roughness Ra of 0.006 μm on the portion constituting the flat surface thereof engraved with a linear pattern having a pitch of 100 μm and a protrusion of 1 μm in such an arrangement that the linear pattern crosses with each other from one surface to another. And the plate is applied to the metal plate of the hot press pre-heated up to 150° C. The pressing temperature was increased up to 260° C. for 30 minutes and after then remained at 260° C. for 20 minutes. The pressing temperature was 260° C. The pressing time was 20 minutes. The pressure at which hot pressing is effected for the last 10 minutes at a temperature of 260° C. was 50 g/cm².

The hot pressing was effected in an oven. The atmospheric pressure in the oven was 20 mmHg.

The resin substrate thus hot-pressed was allowed to cool to a temperature of 90° C. in 20 minutes while being sandwiched between the stainless steel plates. When the entire temperature of the substrate reached 90° C., one of the stainless steel plates was peeled off the resin substrate with a screw driver. As a result, the resin substrate remained stuck to the other stainless steel plate. The other stainless steel plate could be easily peeled off the resin substrate by slowly rolling up it at the end thereof.

The resin substrate thus peeled was then kept in a 160° C. oven for 2 hours so that it was annealed to thoroughly relax the residual stress. Thus, a desired transparent resin substrate was obtained. However the resin substrate is appeared to be yellow-colored little.

The resin substrate thus obtained exhibited a birefringence index of from 0 to 5 nm all over the surface thereof as calculated in terms of single pass retardation value and a surface roughness Ra of 0.007 μm. A section of the resin substrate was photographed by an atomic force microscope. As a result, it was found that the linear pattern on the metal plates had been transferred to the resin substrate in a proportion of not less than 90% as calculated in terms of sectional area ratio.

The resin substrate also exhibited an impact strength of not less than 10,000 gf·cm as determined by Du Pont impact strength test. The transparent resin substrate showed no particular visual problems on external appearance such as scar and indentation.

Comparative Example 8

An injection-compressed plate was prepared in the same manner as in Example 4 except that as a starting material there was used a polycarbonate A with a viscosity-average molecular weight of 16,000, LT of from 85 to 90% and Tg of 148° C. and the resulting plate had a thickness of 1 mm and a A5 size.

Subsequently, prior to moistening, this plate was subjected to hot pressing between stainless steel plates having a surface roughness Ra of 0.005 μm and pre-heated up to 80° C. And then the pressing temperature was increased up to 140° C. for 2 minutes and after then remained at 140° C. for 20 minutes. The pressure at which hot pressing is effected at a temperature of 140° C. was 200 g/cm² for last 5 minutes. The hot pressing was effected in an oven. The atmospheric pressure in the oven was 20 mmHg. The resin substrate thus hot-pressed was allowed to cool to a temperature of 100° C. in about 5 minutes while being sandwiched between the stainless steel plates. When the entire temperature of the substrate reached 100° C., one of the stainless steel plates was peeled off the resin substrate with a screw driver. As a result, the resin substrate remained stuck to the other stainless steel plate. The other stainless steel plate could be easily peeled off the resin substrate by slowly rolling up it at the end thereof.

The resin substrate thus peeled was then kept in a 120° C. oven for 2 hours so that it was annealed to thoroughly relax the residual stress. Thus, a desired resin substrate was obtained.

Due to the insufficient hot pressing temperature, the resin substrate thus obtained exhibited a birefringence index of from 15 to 25 nm all over the surface thereof as calculated in terms of single pass retardation value and a surface roughness Ra of 0.02 μm. The resin substrate also exhibited an impact strength of not less than 10,000 gf·cm as determined by Du Pont impact strength test. The resin substrate showed unevenness on the surface thereof when visually observed.

Comparative Example 9

A polycarbonate P with a viscosity-average molecular weight of 20,000, LT of from 85 to 90% and Tg of 182° C. was subjected to injection molding in an injection compression mold through a M-200B type 200 ton injection machine (produced by Meiki Co., Ltd.) to obtain a 5×5 cm size plate having a thickness of 0.8 mm.

Subsequently, prior to moistening, this plate was subjected to hot pressing between stainless steel plates having a surface roughness Ra of 0.005 μm and pre-heated up to 160° C. And then the pressing temperature was increased up to 320° C. for 20 minutes and after then remained at 320° C. for 30 minutes. The pressure at which hot pressing is effected at a temperature of 320° C. was 10 g/cm² for last 3 minutes. The hot pressing was effected in an oven. The atmospheric pressure in the oven was 30 mmHg. The resin substrate thus hot-pressed was allowed to cool to a temperature of 140° C. in 20 minutes while being sandwiched between the stainless steel plates. When the entire temperature of the resin substrate reached 140° C., one of the stainless steel plates was peeled off the resin substrate with a screw driver. As a result, the resin substrate remained stuck to the other stainless steel plate. The other stain less steel plate was peeled off the resin substrate by slowly rolling up it at the end thereof. However, the resin substrate was partly cracked in the course of peeling. This is seemed to be due to being brittle by heat deterioration and poor peeling.

The resin substrate thus peeled was then kept in a 145° C. oven for 2 hours so that it was annealed to thoroughly relax the residual stress. Thus, a desired resin substrate was obtained.

The resin substrate thus obtained exhibited a birefringence index of from 0 to 5 nm all over the surface thereof as calculated in terms of single pass retardation value and a surface roughness Ra of 0.004 μm. The resin substrate also exhibited an impact strength of not less than 10,000 gf·cm as determined by Du Pont impact strength test. However, the resin substrate showed yellowing on the surface thereof when visually observed.

Comparative Example 10

An injection-compressed plate was prepared in the same manner as in Example 4 except that as a starting material there was used a polycarbonate P with a viscosity-average molecular weight of 14,000, LT of from 85 to 90% and Tg of 180° C. and the resulting plate had a thickness of 1 mm and a A5 size.

Subsequently, prior to moistening, this plate was subjected to hot pressing between stainless steel plates having a surface roughness Ra of 0.02 μm and pre-heated up to 100° C. And then the pressing temperature was increased up to 240° C. for 10 minutes and after then remained at 240° C. for 20 minutes. The pressure at which hot pressing is effected at a temperature of 240° C. was 50 g/cm² for last 10 minutes. The hot pressing was effected in an oven. The atmospheric pressure in the oven was 50 mmHg. The resin substrate thus hot-pressed was allowed to cool to a temperature of 140° C. in 20 minutes while being sandwiched between the stainless steel plates. When the entire temperature of the resin substrate reached 140° C., one of the stainless steel plates was peeled off the resin substrate with a screw driver. As a result, the resin substrate remained stuck to the other stainless steel plate. The other stainless steel plate could be easily peeled off the resin substrate by slowly rolling up it at the end thereof.

The resin substrate thus peeled was then kept in a 140° C. oven for 2 hours so that it was annealed to thoroughly relax the residual stress. Thus, a desired resin substrate was obtained.

The resin substrate thus obtained exhibited a birefringence index of from 0 to 5 nm all over the surface thereof as calculated in terms of single pass retardation value and a surface roughness Ra of 0.07 μm. The resin substrate also exhibited an impact strength of not less than 10,000 gf·cm as determined by Du Pont impact strength test. However, the resin substrate showed nonspecular surface when visually observed. The STN liquid crystal display element having a diagonal line of 5 inch thus assembled showed color stain on both surfaces.

Comparative Example 11

An injection-compressed plate was prepared in the same manner as in Example 4 except that as a starting material there was used a polycarbonate P with a viscosity-average molecular weight of 16,000, LT of from 85 to 90% and Tg of 180° C. and the resulting plate had a thickness of 0.7 mm and a A5 size.

Subsequently, prior to moistening, this plate was subjected to hot pressing between stainless steel plates having a surface roughness Ra of 0.004 μm and pre-heated up to 100° C. And then the pressing temperature was increased up to 240° C. for 10 minutes and after then remained at 240° C. for 20 minutes. The pressure at which hot pressing is effected at a temperature of 240° C. was 40 g/cm² for last 15 minutes. The hot pressing was effected in an oven. The atmospheric pressure in the oven was 760 mmHg, and the oxygen concentration in the oven was 1% by volume. The resin substrate thus hot-pressed was allowed to cool to a temperature of 140° C. in about 20 minutes while being sandwiched between the stainless steel plates. When the entire temperature of the resin substrate reached 140° C., one of the stainless steel plates was peeled off the resin substrate with a screw driver. As a result, the resin substrate remained stuck to the other stainless steel plate. The other stainless steel plate could be peeled off the resin substrate by slowly rolling up it at the end thereof.

The resin substrate thus peeled was then kept in a 140° C. oven for 2 hours so that it was annealed to thoroughly relax the residual stress. Thus, a desired resin substrate was obtained.

The resin substrate thus obtained exhibited a birefringence index of from 0 to 5 nm all over the surface thereof as calculated in terms of single pass retardation value and a surface roughness Ra of 0.006 μm. The resin substrate also exhibited an impact strength of not less than 10,000 gf·cm as determined by Du Pont impact strength test. However, the resin substrate showed yellowing on the edge thereof when visually observed. Further, since the atmospheric pressure was too high despite of its size as great as A5 size, the resin substrate had been insufficiently degassed. Thus, the resin substrate showed the presence of bubbles when visually observed.

Comparative Example 12

An injection-compressed plate was prepared in the same manner as in Example 4 except that as a starting material there was used a polycarbonate P with a viscosity-average molecular weight of 18,000, LT of from 85 to 90% and Tg of 181° C. and the resulting plate had a thickness of 0.6 mm and a A5 size.

Subsequently, prior to moistening, this plate was subjected to hot pressing between stainless steel plates having a surface roughness Ra of 0.004 μm and pre-heated up to 100° C. And then the pressing temperature was increased up to 240° C. for 10 minutes and after then remained at 240° C. for 20 minutes. The pressure at which hot pressing is effected at a temperature of 240° C. was 50 g/cm² for last 1510 minutes. The hot pressing was effected in an oven. The atmospheric pressure in the oven was 60 mmHg. The resin substrate thus hot-pressed was allowed to cool to a temperature of 120° C. in about 20 minutes while being sandwiched between the stainless steel plates. When the entire temperature of the resin substrate reached 120° C., the stainless steel plates were peeled off the resin substrate with a screw driver. As a result, the resin substrate remained partly stuck to the stainless steel plates. The resin substrate showed cracking. Thus, the resin substrate could not be clearly peeled.

Comparative Example 13

An injection-compressed plate was prepared in the same manner as in Example 4 except that as a starting material there was used a polycarbonate P with a viscosity-average molecular weight of 18,000, LT of from 85 to 90% and Tg of 181° C. and the resulting plate had a thickness of 0.6 mm and a A5 size.

Subsequently, prior to moistening, this plate was subjected to hot pressing between stainless steel plates having a surface roughness Ra of 0.004 µm and pre-heated up to 100° C. And then the pressing temperature was increased up to 240° C. for 10 minutes and after then remained at 240° C. for 20 minutes. The pressing temperature was 240° C. The pressing time was 30 minutes. The pressure at which hot pressing is effected at a temperature of 240° C. was 40 g/cm$^2$ for last 15 minutes. The hot pressing was effected in an oven. The atmospheric pressure in the oven was 60 mmHg. The resin substrate thus hot-pressed was allowed to cool to a temperature of 70° C. in about 20 minutes while being sandwiched between the stainless steel plates. When the entire temperature of the resin substrate reached 70° C., the stainless steel plates were peeled off the resin substrate with a screw driver. As a result, the resin substrate was cracked to pieces.

Comparative Example 14

A polycarbonate Z' with a viscosity-average molecular weight of 30,000 (LT: 90%; Tg: 208° C.) was subjected to injection molding in an injection compression mold through a M-200B type 200 ton injection machine (produced by Meiki Co., Ltd.) to obtain a 5×5 cm size plate having a thickness of 3 mm.

Subsequently, prior to moistening, this plate was subjected to hot pressing between metal plates having a surface roughness Ra of 0.006 µm and pre-heated up to 180° C. on the portion constituting the flat surface thereof engraved with a linear pattern having a pitch of 100 µm and a protrusion of 1 µm in such an arrangement that the linear pattern crosses with each other from one surface to another. And then the pressing temperature was increased up to 230° C. for 10 minutes and after then remained at 230° C. for 10 minutes. The pressing temperature was 230° C. The pressing time was 20 minutes. The pressure at which hot pressing is effected for the last 10 minutes at a temperature of 230° C. was 50 g/cm$^2$.

The hot pressing was effected in an oven. The atmospheric pressure in the oven was 20 mmHg.

The resin substrate thus hot-pressed was allowed to cool to a temperature of 60° C. in 20 minutes while being sandwiched between the stainless steel plates. When the entire temperature of the resin substrate reached 60° C., the stainless steel plates were separated from the resin substrate with a screw driver. As a result, the resin substrate was observed cracked. The cracked resin substrate was then peeled off the stainless steel plate by rolling up it at the end thereof. The resin substrate thus peeled was then kept in a 160° C. oven for 2 hours so that it was annealed to thoroughly relax the residual stress. Thus, a transparent sheet was obtained.

The resin substrate thus obtained exhibited a birefringence index of 30 nm at maximum and 20 nm on the average all over the surface thereof as calculated in terms of single pass retardation value.

The resin substrate exhibited a surface roughness Ra of from 0.01 to 0.02 µm on the portion thereof constituting the flat surface. A section of the resin substrate was photographed by an atomic force microscope. As a result, it was found that the linear pattern on the metal plates had been transferred to the resin substrate in a proportion of only 90% as calculated in terms of sectional area ratio.

TABLE 3

| | | | Properties of resin | | | | Heat treatment conditions | | | | |
| | | | | | | | Hot | | | | |
| Example | Base resin | Substrate forming method | % Light transmittance | Tg (° C.) | V.a.m.w.* | Substrate size (cm) | Metal plate precision Ra (µm) | press temp. (° C.) | Hot press pressure (g/cm$^2$) | O$_2$ conc. (%) | Atmospheric pressure (mmHg) |
|---|---|---|---|---|---|---|---|---|---|---|---|
| Comparative Example | | | | | | | | | | | |
| 8 | PC A | i + h.p. | 85–90 | 148 | 16,000 | 15 × 20 | 0.005 | 140 | 200 | | 20 |
| 9 | PC P | i + h.p. | 85–90 | 182 | 20,000 | 5 × 5 | 0.005 | 320 | 10 | | 30 |
| 10 | PC P | i + h.p. | 85–90 | 180 | 14,000 | 15 × 20 | 0.02 | 240 | 50 | | 50 |
| 11 | PC P | i + h.p. | 85–90 | 180 | 16,000 | 15 × 20 | 0.004 | 240 | 40 | 18 | 760 |
| 12 | PC P | i + h.p. | 85–90 | 181 | 18,000 | 15 × 20 | 0.004 | 240 | 50 | | 60 |
| 13 | PC P | i + h.p. | 85–90 | 181 | 18,000 | 15 × 20 | 0.004 | 240 | 50 | | 60 |
| 14 | PC Z' | i + h.p. | 90 | 208 | 30,000 | 5 × 5 | 0.006 | 230 | 50 | | 20 |
| Example | | | | | | | | | | | |
| 4 | PC P | i + h.p. | 85–90 | 180 | 14,000 | 5 × 5 | 0.004 | 260 | 50 | 1 | 750 |
| 5 | PC AP | i + h.p. | 85–90 | 170 | 14,000 | 15 × 20 | 0.005 | 250 | 30 | | 30 |

TABLE 3-continued

| | | | | | | | | | | |
|---|---|---|---|---|---|---|---|---|---|---|
| 6 | PC Z'A | i + h.p. | 85–90 | 175 | 18,000 | 15 × 20 | 0.008 | 260 | 40 | 30 |
| 7 | PC Z'A | i + h.p. | 85–90 | 175 | 18,000 | 5 × 5 | 0.006 | 260 | 50 | 20 |

| | Heat treatment conditions | | | Results of evaluation | | |
|---|---|---|---|---|---|---|
| Example No. | Peeling temperature (° C.) | Annealing temperature (° C.) | Birefringence index (nm) | Surface precision Ra ($\mu$m) | Impact strength (gf · cm) | Visual appearance |
| Comparative Example | | | | | | |
| 8 | 100 | 120 | 15–25 | 0.02 | >10,000 | Unevenness |
| 9 | 140 | 145 | 0–5 | 0.005 | >10,000 | Yellowing |
| 10 | 140 | 140 | 0–5 | 0.07 | >10,000 | Insufficient smoothness |
| 11 | 140 | 140 | 0–5 | 0.006 | >10,000 | Yellowing at edge, air bubble |
| 12 | 120 | | | | | Cracked during peeling |
| 13 | 70 | | | | | Cracked down during peeling |
| 14 | 60 | 160 | 20 | 0.01–0.02 | | Transferability ≦60% |
| Example | | | | | | |
| 4 | 130 | 145 | 0–5 | 0.004 | >10,000 | No trouble |
| 5 | 130 | 145 | 0–5 | 0.005 | >10,000 | No trouble |
| 6 | 140 | 150 | 0–5 | 0.008 | >10,000 | No trouble |
| 7 | 90 | 160 | 0–5 | 0.007 | >10,000 | No trouble |

*v.a.m.w.: viscosity-average molecular weight

EXAMPLE 8

A polycarbonate with a viscosity-average molecular weight of 18,000 and Tg of 178° C. (a 55/45 melt mixture of a copolymer comprising 1, 1-bis(4-hydroxyphenyl)-3, 3, 5-trimethylcyclohexane unit (having a structural formula set forth in Table 2) and bisphenol A unit at ratio of 55/45 and A-polycarbonate (having a structural formula set forth in Table 2) was subjected to injection molding in an injection compression mold through a M-200B type 200 ton injection machine (produced by Meiki Co., Ltd.) to obtain a 5×5 cm size plate having a thickness of 0.8 mm.

Subsequently, prior to moistening, this plate was subjected to hot pressing between stainless steel plates having a surface roughness Ra of 0.004 $\mu$m and pre-heated up to 100° C. in such a manner that the surface thereof was not stained. And then the pressing temperature was increased up to 260° C. for 10 minutes and after then remained at 260° C. for 20 minutes. The pressure at which hot pressing is effected at the final stage of 260° C. was 50 g/cm² for last 5 minutes. The hot pressing was effected in an oven. The atmospheric pressure in the oven was 750 mmHg, and the oxygen concentration in the oven was not more than 0.1% by volume. The resin substrate thus hot-pressed was allowed to cool to a temperature of 100° C. in 20 minutes while being sandwiched between the stainless steel plates. When the entire temperature of the resin substrate reached 100° C., one of the stainless steel plates was peeled off the resin substrate with a screw driver. As a result, the resin substrate remained stuck to the other stainless steel plate. The other stainless steel plate could be easily peeled off the resin substrate by slowly rolling up it at the end thereof. The thickness of the resin substrate was 0.5 mm.

The resin substrate thus peeled was then kept in a 150° C. oven for 2 hours so that it was annealed to thoroughly relax the residual stress. Thus, a desired resin substrate was obtained.

The resin substrate thus obtained exhibited a birefringence index of from 0 to 2 nm all over the surface thereof as calculated in terms of single pass retardation value and a surface roughness Ra of 0.004 $\mu$m. The resin substrate also exhibited an impact strength of not less than 10,000 gf·cm as determined by Du Pont impact strength test. The transparent resin substrate showed no particular visual problems on external appearance.

The resin substrate was then used to assemble an STN liquid crystal display panel. The STN liquid crystal display panel having a diagonal line of 5 inch thus assembled showed no particular defects such as color stain.

EXAMPLE 9

A polycarbonate with a viscosity-average molecular weight of 19,000 and Tg of 208° C. (a copolymer comprising 1, 1-bis(4-hydroxyphenyl)-3, 3, 5-trimethylcyclohexane unit and bisphenol A unit at ratio of 55/45) was subjected to injection molding in an injection compression mold through a M-200B type 200 ton injection machine (produced by Meiki Co., Ltd.) to obtain a 5×5 cm size plate having a thickness of 0.8 mm.

Subsequently, prior to moistening, this plate was subjected to hot pressing between stainless steel plates having a surface roughness Ra of 0.004 $\mu$m and pre-heated up to 100° C. in such a manner that the surface thereof was not stained. And then the pressing temperature was increased up to 280° C. for 10 minutes and after then remained at 280° C. for 10 minutes. The pressure at which hot pressing is effected at the final stage of 280° C. was 10 g/cm² for last 3 minutes. The hot pressing was effected in an oven. The atmospheric pressure in the oven was not more than 10 mmHg. The resin substrate thus hot-pressed was allowed to cool to a temperature of 120° C. in 20 minutes while being sandwiched between the stainless steel plates. When the entire temperature of the resin substrate reached 120° C., one of the stainless steel plates was peeled off the resin substrate with a screw driver. As a result, the resin substrate remained stuck to the other stainless steel plate. The other stainless steel plate could be easily peeled off the resin substrate by slowly rolling up it at the end thereof. The thickness of the resin substrate was 0.6 mm.

The resin substrate thus peeled was then kept in a 180° C. oven for 2 hours so that it was annealed to thoroughly relax the residual stress. Thus, a desired resin substrate was obtained.

The resin substrate thus obtained exhibited a birefringence index of from 0 to 5 nm all over the surface thereof as calculated in terms of single pass retardation value and a surface roughness Ra of 0.005 μm. The resin substrate also exhibited an impact strength of not less than 10,000 gf·cm as determined by Du Pont impact strength test. The transparent resin substrate showed no particular visual problems on external appearance.

The resin substrate was then used to assemble an STN liquid crystal display panel. The STN liquid crystal display panel having a diagonal line of 5 inch thus assembled showed no particular defects such as color stain.

Comparative Example 15

An injection-compressed plate was prepared in the same manner as in Example 8 except that as a starting material there was used a polycarbonate P with a viscosity-average molecular weight of 14,000 and Tg of 180° C. (having a structural formula set forth in Table 2) and the resulting plate had a thickness of 1 mm and a A5 size.

Subsequently, prior to moistening, this plate was subjected to hot pressing between stainless steel plates having a surface roughness Ra of 0.005 μm and pre-heated up to 100° C. And then the pressing temperature was increased up to 200° C. for 10 minutes and after then remained at 200° C. for 30 minutes. The pressure at which hot pressing is effected at the final stage of 200° C. was 250 g/cm$^2$ for last 5 minutes. The hot pressing was effected in an oven. The atmospheric pressure in the oven was 20 mmHg. The resin substrate thus hot-pressed was allowed to cool to a temperature of 100° C. in about 20 minutes while being sandwiched between the stainless steel plates. When the entire temperature of the resin substrate reached 100° C., one of the stainless steel plates was peeled off the resin substrate with a screw driver. As a result, the resin substrate remained stuck to the other stainless steel plate. The other stainless steel plate could be easily peeled off the resin substrate by slowly rolling up it at the end thereof.

The resin substrate thus peeled was then kept in a 150° C. oven for 2 hours so that it was annealed to thoroughly relax the residual stress. Thus, a desired resin substrate was obtained.

The resin substrate thus obtained exhibited a birefringence index of from 5 to 25 nm all over the surface thereof as calculated in terms of single pass retardation value due to the insufficient hot pressing temperature and the stacking of benzene rings attributed to the structure containing an aromatic ring in the methylene moiety of bisphenol and a surface roughness Ra of 0.15 μm due to the insufficient hot pressing temperature. The resin substrate also exhibited an impact strength of not less than 10,000 gf·cm as determined by Du Pont impact strength test. The transparent resin substrate showed unevenness on the surface thereof on external appearance.

The resin substrate was then used to assemble an STN liquid crystal display panel. The STN liquid crystal display panel having a diagonal line of 5 inch thus assembled couldn't give a sharp image due to color stain.

Comparative Example 16

A polycarbonate with a viscosity-average molecular weight of 18,000 and Tg of 178° C. (a 55/45 melt mixture of a copolymer comprising 1, 1-bis(4-hydroxyphenyl)-3, 3, 5-trimethylcyclohexane unit and bisphenol A unit at ratio of 55/45 and A-polycarbonate) was dissolved in methylene chloride. The solution thus obtained was then casted over a specular stainless steel plate.

The solvent was then thoroughly evaporated so that the casted material was dried. The coating layer was then peeled off the stainless steel plate to obtain a film having a thickness of 150 μm.

Subsequently, prior to moistening, this plate was subjected to hot pressing between stainless steel plates having a surface roughness Ra of 0.005 μm and pre-heated up to 100° C. And then the pressing temperature was increased up to 260° C. for 20 minutes and after then remained at 260° C. for 20 minutes. The pressure at which hot pressing is effected at a temperature of 260° C. was 1,000 g/cm$^2$ for last 1 minute. The hot pressing was effected in a vacuum oven. The atmospheric pressure in the vacuum oven was 30 mmHg. The resin substrate thus hot-pressed was allowed to cool to a temperature of 110° C. in 20 minutes while being sandwiched between the stainless steel plates. When the entire temperature of the resin substrate reached 110° C., one of the stainless steel plates was peeled off the resin substrate with a screw driver. As a result, the resin substrate remained stuck to the other stainless steel plate. The other stainless steel plate could be easily peeled off the resin substrate by slowly rolling up it at the end thereof. Thus, a film having a thickness of 90 μm was obtained.

The resin substrate thus peeled was then kept in a 150° C. oven for 2 hours so that it was annealed to thoroughly relax the residual stress. Thus, a desired resin substrate was obtained.

The resin substrate thus obtained exhibited a birefringence index of from 0 to 3 nm all over the surface thereof as calculated in terms of single pass retardation value and a surface roughness Ra of 0.004 μm. The resin substrate also exhibited an impact strength of not less than 10,000 gf·cm as determined by Du Pont impact strength test. However, an STN liquid crystal display panel having a diagonal line of 5 inch assembled from this transparent resin substrate had a small thickness that makes it impossible to keep the gap between the substrates constant, causing color stain that makes it impossible to obtain a sharp image.

Comparative Example 17

An injection-compressed plate was prepared in the same manner as in Example 8 except that as a starting material there was used a polycarbonate P with a viscosity-average molecular weight of 14,000 and Tg of 180° C. and the resulting plate had a thickness of 1 mm and a A5 size.

Subsequently, prior to moistening, this plate was subjected to hot pressing between stainless steel plates having a surface precision Ra of 0.02 μm and pre-heated up to 100° C. And then the pressing temperature was increased up to 240° C. for 10 minutes and after then remained at 240° C. for 20 minutes. The pressure at which hot pressing is effected at a temperature of 240° C. was 1,050 g/cm$^2$ for last 3 minutes. The hot pressing was effected in an oven. The atmospheric pressure in the oven was 50 mmHg. The resin substrate thus hot-pressed was allowed to cool to a temperature of 120° C. in 20 minutes while being sandwiched between the stainless steel plates. When the entire temperature of the resin substrate reached 120° C., one of the stainless steel plates was peeled off the resin substrate with a screw driver. As a result, the resin substrate remained stuck to the other stainless steel plate. The other stainless steel plate could be easily peeled off the resin substrate by slowly rolling up it at the end thereof.

The resin substrate thus peeled was then kept in a 150° C. oven for 2 hours so that it was annealed to thoroughly relax the residual stress. Thus, a desired resin substrate was obtained.

The resin substrate thus obtained exhibited a birefringence index of from 5 to 30 nm all over the surface thereof as calculated in terms of single pass retardation value and a surface roughness Ra of 0.07 μm. The resin substrate also exhibited an impact strength of not less than 10,000 gf·cm as determined by Du Pont impact strength test.

The resin substrate was then used to assemble an STN liquid crystal display panel having a diagonal line of 5 inch. Due to the stacking of benzene rings attributed to the structure containing an aromatic ring in the methylene moiety of bisphenol and the excessive pressure during hot pressing, the product showed an insufficiently reduced birefringence index that causes color stain, making it impossible to obtain a sharp image.

Comparative Example 18

An injection-compressed plate was prepared in the same manner as in Example 8 except that as a starting material there was used a polycarbonate A with a viscosity-average molecular weight of 16,000 and Tg of 150° C. and the resulting plate had a thickness of 0.7 mm and a A5 size.

Subsequently, prior to moistening, this plate was subjected to hot pressing between stainless steel plates having a surface precision Ra of 0.004 μm and pre-heated up to 100° C. in such a manner that the surface thereof was not stained. And then the pressing temperature was increased up to 240° C. for 10 minutes and after then remained at 240° C. for 20 minutes. The pressure at which hot pressing is effected at a temperature of 240° C. was 40 g/cm$^2$ for last 5 minutes. The hot pressing was effected in an oven. The atmospheric pressure in the oven was 760 mmHg, and the oxygen concentration in the oven was 18% by volume. The resin substrate thus hot-pressed was allowed to cool to a temperature of 110° C. in about 20 minutes while being sandwiched between the stainless steel plates. When the entire temperature of the resin substrate reached 110° C., the stainless steel plates were peeled off the resin substrate with a screw driver. As a result, the resin substrate remained partly stuck to the stainless steel plates and showed cracking. Thus, a partly lost substrate sample having a thickness of 0.4 mm was obtained.

The resin substrate thus peeled was then kept in a 120° C. oven for 2 hours so that it was annealed to thoroughly relax the residual stress. Thus, a desired resin substrate was obtained.

The resin substrate thus obtained exhibited a birefringence index of from 2 to 25 nm all over the surface thereof as calculated in terms of single pass retardation value and a surface roughness Ra of 0.006 μm. The resin substrate also exhibited an impact strength of not less than 10,000 gf·cm as determined by Du Pont impact strength test. The resin substrate showed yellowing on the edge thereof when visually observed. Further, since the atmospheric pressure was too high despite of its size as great as A5 size, the resin substrate had been insufficiently degassed. Thus, the resin substrate showed the presence of bubbles when visually observed.

Comparative Example 19

A polycarbonate with a viscosity-average molecular weight of 30,000 and Tg of 210° C. (a copolymer comprising 1, 1-bis(4-hydroxyphenyl)-3, 3, 5-trimethylcyclohexane unit and bisphenol A unit at ratio of 55/45) was formed by an extrusion method using a polishing roll to form a sheet having a thickness of 1.0 mm.

Subsequently, prior to moistening, this plate was subjected to hot pressing between stainless steel plates having a surface precision Ra of 0.004 μm and pre-heated up to 180° C. in such a manner that the surface thereof was not stained. And then the pressing temperature was increased up to 280° C. for 10 minutes and after then remained at 280° C. for 10 minutes. The pressure at which hot pressing is effected at a temperature of 240° C. was 50 g/cm$^2$ for last 5 minutes. The hot pressing was effected in an oven. The atmospheric pressure in the oven was 20 mmHg. The resin substrate thus hot-pressed was allowed to cool to a temperature of 120° C. in about 20 minutes while being sandwiched between the stainless steel plates. When the entire temperature of the resin substrate reached 120° C., one of the stainless steel plates was peeled off the resin substrate with a screw driver. As a result, the resin substrate remained stuck to the other stainless steel plate. The other stainless steel plate could be easily peeled off the resin substrate by slowly rolling up it at the end thereof.

The resin substrate thus peeled was then kept in a 180° C. oven for 2 hours so that it was annealed to thoroughly relax the residual stress. Thus, a desired resin substrate was obtained.

Since the resin substrate had a great molecular weight, excessive shrinkage stress can occur at the same time with the relaxation of orientation upon heating, making it impossible to obtain sufficiently low birefringence index and desired surface properties. Thus, the resin substrate exhibited a birefringence index of from 15 to 35 nm all over the surface thereof as calculated in terms of single pass retardation value and a surface roughness Ra of not less than 0.1 μm, demonstrating that a visually definite undulation occurred. The resin substrate also exhibited an impact strength of not less than 10,000 gf·cm as determined by Du Pont impact strength test.

Comparative Example 20

An injection-compressed plate was prepared in the same manner as in Example 8 except that as a starting material there was used a polycarbonate with a viscosity-average molecular weight of 18,000 and Tg of 178° C. (a 55/45 melt mixture of a copolymer comprising 1, 1-bis(4-hydroxyphenyl)-3, 3, 5-trimethylcyclohexane unit and bisphenol A unit at ratio of 55/45 and A-polycarbonate) and the resulting plate had a thickness of 0.6 mm and a A5 size.

Subsequently, prior to moistening, this plate was subjected to hot pressing between stainless steel plates having a surface precision Ra of 0.004 μm and pre-heated up to 120° C. in such a manner that the surface thereof was not stained. And then the pressing temperature was increased up to 260° C. for 10 minutes and after then remained at 260° C. for 10 minutes. The pressure at which hot pressing is effected at a temperature of 260° C. was 50 g/cm$^2$ for last 5 minutes. The hot pressing was effected in an oven. The atmospheric pressure in the oven was 60 mmHg. The resin substrate thus hot-pressed was allowed to cool to a temperature of 60° C. in about 20 minutes while being sandwiched between the stainless steel plates. When the entire temperature of the resin substrate reached 60° C., the stainless steel plates were peeled off the resin substrate with a screw driver. As a result, the resin substrate was cracked to pieces.

The optical transparent resin sheet or part according to the present invention has an excellent formability, a light weight, a high toughness and an optical isotropy and thus is very useful as various optical parts ranging from optical communications parts to display elements such as parts for liquid crystal projector and liquid display element. Thus, the optical transparent resin sheet or part according to the present invention has an extremely great industrial value.

What is claimed is:

1. An optical transparent resin sheet having a visible light transmittance of not less than 80%, a glass transition temperature of not lower than 150° C. and a thickness of from 0.2 to 1.5 mm, which exhibits a birefringence index of not higher than 15 nm, a surface roughness Ra of not more than 0.1 μm and an impact strength of not less than 600 gf·cm as calculated in terms of breakdown energy determined by DuPont dropping ball process impact resistance test, wherein said transparent resin is a polycarbonate or polyester carbonate, said transparent resin has a viscosity-average molecular weight of from 10,000 to 25,000, and said transparent resin comprises a carbonate connecting unit having a glass transition temperature of not lower than 130° C. and containing a cyclic aliphatic group incorporated therein in an amount of not less than 5 mol-% based on the total weight of carbonate connecting units.

2. The optical transparent resin sheet according to claim 1, wherein said transparent resin is a thermoplastic resin.

3. The optical transparent resin sheet according to claim 1, wherein said cyclic aliphatic group incorporated in said carbon connecting unit is one derived from 1, 1-bis(4-hydroxyphenyl)cyclohexane.

4. The optical transparent resin sheet according to claim 1, which has a thickness of from 0.4 to 1.1 mm.

5. The optical transparent resin sheet according to claim 1, which exhibits an impact strength of not less than 10,000 gf·cm as calculated in terms of breakdown energy.

6. The optical transparent resin sheet according to claim 1, wherein said transparent resin comprises a polycarbonate resin having a carbonate connecting unit containing a cyclic aliphatic group and a polycarbonate resin having a bisphenol A unit incorporated therein in admixture at a ratio of from 2:8 to 8:2.

7. The optical transparent resin sheet according to claim 1, which is used for liquid display element.

8. An optical transparent resin part having a visible light transmittance of not less than 80% and a glass transition temperature of not lower than 80° C., which exhibits a birefringence index of not higher than 15 nm, a surface roughness Ra of not more than 0.1 μm.

9. The optical transparent resin part according to claim 8, which exhibits a birefringence index of not more than 15 nm and has a thickness of not less than 0.2 mm at maximum.

10. A process for the preparation of an optical transparent resin sheet according to claim 1, which comprises hot-pressing a transparent resin having a visible light transmittance of not less than 80% and a glass transition temperature of not lower than 80° C. or its work at a temperature represented by the following relationship (1):

$$\overline{Mv}/600+Tg+140 \geq T \geq \overline{Mv}/600+Tg-20 \quad (1)$$

wherein T represents a heat treatment temperature (° C.); Tg represents the glass transition temperature (° C.) of said resin; and $\overline{Mv}$ represents the viscosity-average molecular weight of said resin.

11. The process for the preparation of an optical transparent resin sheet according to claim 10, wherein the upper and lower members of the hot press between which said transparent resin or its work is sandwiched during hot pressing have a surface made of a metallic material or inorganic material and the portion of said members constituting these surfaces has a roughness Ra of not more than 0.1 μm.

12. The process for the preparation of an optical transparent resin sheet according to claim 10, wherein said work of transparent resin is one prepared by injection molding.

13. The process for the preparation of an optical transparent resin sheet according to claim 10, wherein the ambient atmosphere of said transparent resin or its work during hot pressing is an inert gas or vacuum.

14. The process for the preparation of an optical transparent resin sheet according to claim 10, wherein average value of the pressure P under which hot pressing is effected for more than 1 minute at the final stage at the temperature represented by the foregoing relationship (1) is from 0 to 1,000 (g/cm²).

15. The process for the preparation of an optical transparent resin sheet according to claim 10, wherein the temperature D (° C.) at which said transparent or work thereof which has been hot-pressed is peeled off said members of the hot press between which it has been sandwiched falls within the range represented by the following relationship:

$$Tg > D \geq Tg-120$$

wherein Tg represents the glass transition temperature (° C.) of said resin, and the molded product thus peeled off the hot press is then annealed at a temperature represented by the following relationship:

ti $Tg-10 > D \geq Tg-50$.

* * * * *